US012638056B2

(12) United States Patent
Maienschein

(10) Patent No.: US 12,638,056 B2
(45) Date of Patent: May 26, 2026

(54) TORQUE TRANSMISSION DEVICE AND DRIVE TRAIN FOR A MOTOR VEHICLE

(71) Applicant: Schaeffler Technologies AG & Co. KG, Herzogenaurach (DE)

(72) Inventor: Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 352 days.

(21) Appl. No.: 18/569,251

(22) PCT Filed: May 23, 2022

(86) PCT No.: PCT/DE2022/100391
§ 371 (c)(1),
(2) Date: Dec. 12, 2023

(87) PCT Pub. No.: WO2022/262896
PCT Pub. Date: Dec. 22, 2022

(65) Prior Publication Data
US 2024/0271666 A1     Aug. 15, 2024

(30) Foreign Application Priority Data

Jun. 16, 2021    (DE) .......................... 102021115521.5

(51) Int. Cl.
*F16D 3/12* (2006.01)
*B60K 6/40* (2007.10)
*B60K 6/442* (2007.10)

(52) U.S. Cl.
CPC .................. *F16D 3/12* (2013.01); *B60K 6/40* (2013.01); *B60K 6/442* (2013.01); *B60Y 2200/92* (2013.01)

(58) Field of Classification Search
CPC ........ F16D 3/12; B60K 6/40; B60K 2006/264
See application file for complete search history.

(56) References Cited

U.S. PATENT DOCUMENTS

| | | | | |
|---|---|---|---|---|
| 6,388,348 B2 * | 5/2002 | van Heyden | .......... | B60K 6/405 |
| | | | | 310/78 |
| 8,267,208 B2 * | 9/2012 | Kleuker | .................. | B60K 6/48 |
| | | | | 477/3 |

(Continued)

FOREIGN PATENT DOCUMENTS

| | | |
|---|---|---|
| DE | 19954372 A1 | 6/2001 |
| DE | 102011102225 A1 | 12/2011 |

(Continued)

*Primary Examiner* — Jeffrey J Restifo

(57) ABSTRACT

A torque transmission device for a motor vehicle includes a rotor carrier mounted rotatably about an axis of rotation, an input hub, an output hub, and a torsion damper. The rotor carrier has a fastening portion and a first flange portion. The fastening portion and the input hub are arranged on a first axial side of the first flange portion and are connected to the first flange portion. The torsion damper has an energy storage element and a damper output part, which includes a second flange portion and an actuating portion operatively connected to the energy storage element. The second flange portion is torque-transmittingly connected to the output hub and the actuating portion. The second flange portion is situated axially between the first flange portion and the output hub. The first flange portion has a through-opening through which the actuating portion passes.

20 Claims, 3 Drawing Sheets

(56) References Cited

U.S. PATENT DOCUMENTS

| | | | | |
|---|---|---|---|---|
| 9,662,966 | B2 * | 5/2017 | El Baraka | B60K 6/40 |
| 10,093,163 | B2 * | 10/2018 | Schmitt | F16D 25/126 |
| 10,434,865 | B2 * | 10/2019 | Gorges | B60K 6/48 |
| 10,511,207 | B2 * | 12/2019 | Chamberlin | B60K 6/26 |
| 10,843,557 | B2 * | 11/2020 | Reimnitz | B60K 6/48 |
| 11,028,899 | B1 * | 6/2021 | Nelson | H02K 7/108 |
| 11,505,055 | B2 * | 11/2022 | Payne | F16H 45/02 |
| 12,358,363 | B2 * | 7/2025 | Kim | B60K 6/36 |
| 2007/0267270 | A1 * | 11/2007 | Sudau | F16D 21/06 |
| | | | | 192/55.61 |
| 2017/0050506 | A1 * | 2/2017 | Trinkenschuh | F03D 1/0675 |
| 2022/0205491 | A1 * | 6/2022 | Yoshikawa | F16F 15/12353 |
| 2023/0193963 | A1 * | 6/2023 | Weis | B60K 6/387 |
| | | | | 192/48.609 |
| 2024/0271666 | A1 * | 8/2024 | Maienschein | F16F 15/1208 |
| 2024/0408954 | A1 * | 12/2024 | Lee | B60K 6/36 |
| 2025/0388073 | A1 * | 12/2025 | Kee | B60K 6/26 |

FOREIGN PATENT DOCUMENTS

| | | | |
|---|---|---|---|
| DE | 102013213422 | A1 | 2/2014 |
| DE | 102014219967 | A1 | 4/2016 |
| DE | 112018005228 | T5 | 6/2020 |
| DE | 102020105982 | A1 | 5/2021 |
| DE | 102021123225 | A1 | 7/2022 |
| FR | 2802265 | A1 | 6/2001 |
| WO | 2015155137 | A1 | 10/2015 |
| WO | 2020030215 | A1 | 2/2020 |

* cited by examiner

TORQUE TRANSMISSION DEVICE AND DRIVE TRAIN FOR A MOTOR VEHICLE

CROSS-REFERENCE TO RELATED APPLICATIONS

This application is the U.S. National Phase of PCT Appln. No. PCT/DE2022/100391 filed May 23, 2022, which claims priority to DE 102021115521.5 filed Jun. 16, 2021, the entire disclosures of which are incorporated by reference herein.

TECHNICAL FIELD

The present disclosure relates to a torque transmission device having a rotor carrier for an electric motor and at least one torsion damper.

BACKGROUND

Torque transmission devices having a rotor carrier for an electric motor and a torsion damper are already known from WO 2020/030215 A1.

SUMMARY

The present disclosure, according to an exemplary embodiment, provides an improved torque transmission device and an improved drive train for a motor vehicle.

It has been recognized that an improved torque transmission device for a drive train of a motor vehicle can be provided by the torque transmission device having a rotor carrier mounted rotatably about an axis of rotation, an input hub, an output hub, and a torsion damper. The rotor carrier has a fastening portion, extending in an axial direction radially outwardly with respect to the input hub and a first flange portion, extending in a radial direction. The fastening portion and the input hub are arranged on a first axial side of the first flange portion and are connected to the first flange portion. The torsion damper has a first energy storage element and a damper output part, wherein the damper output part has a second flange portion, extending in the radial direction, and an actuating portion, extending in the axial direction along the axis of rotation and operatively connected to the first energy storage element. Radially on the inside, the second flange portion is connected in a torque-transmitting manner to the output hub and, radially on the outside, the second flange portion is connected in a torque-transmitting manner to the actuating portion. The second flange portion is axially arranged between the first flange portion and the output hub. The first flange portion has at least one through-opening which extends in the axial direction and through which the actuating portion passes. This embodiment has the advantage that the torque transmission device has a particularly small axial installation space requirement.

In a further embodiment, the torsion damper has a damper input part. The damper input part has a third flange portion, extending in the radial direction, and a coupling portion, extending in the axial direction along the axis of rotation and connected to the third flange portion. The third flange portion is fastened to the first axial side of the first flange portion. The coupling portion extends away from the first axial side and is operatively connected to the first energy storage element. The coupling portion is arranged radially on the inside with respect to the actuating portion. The first flange portion of the rotor carrier is rotatable relative to the actuating portion against the action of the first energy storage element by a first torque which can be introduced into the torque transmission device via the input hub for torque transmission of the first torque to the output hub. As a result, the installation space required in the radial direction is particularly small and the torsion damper has a high damping capacity.

In a further embodiment, the torsion damper has a second energy storage element, wherein the first energy storage element is arranged spaced apart from the second energy storage element in the circumferential direction. The actuating portion is arranged in the circumferential direction between the first energy storage element and the second energy storage element and is operatively connected to both energy storage elements. This allows the damper output part to be designed as particularly lightweight.

In a further embodiment, the through-opening is formed partially annular and extends in the circumferential direction with respect to the axis of rotation over at least a first angular segment. The actuating portion extends in the circumferential direction with respect to the axis of rotation through a second angular segment, wherein the second angular segment is smaller than the first angular segment.

In a further embodiment, the first flange portion is arranged in a substantially disc-shaped manner extending in a plane of rotation with respect to the axis of rotation. This embodiment has the advantage that the first flange portion can be manufactured particularly simply, for example from sheet metal, at low cost.

In a further embodiment, the torque transmission device has a bearing cover and a bearing arrangement, wherein the bearing cover has a bearing portion extending in the axial direction. Radially between the input hub and the bearing portion, the bearing arrangement is arranged for supporting the input hub on the bearing portion. The bearing portion extends in the direction of the first axial side and has an axial overlap with the torsion damper and/or the fastening portion. This embodiment has the advantage that the drive train requires particularly little installation space in the axial direction and in the radial direction.

In a further embodiment, the damper output part has a second flange portion, extending in the radial direction, wherein the second flange portion is connected radially outwardly to the actuating portion and radially inwardly to the output hub. The second flange portion is arranged on a second axial side of the first flange portion facing away from the torsion damper.

In a further embodiment, the bearing cover has a cover portion extending in the radial direction, which is radially outwardly adjacent to the bearing portion, wherein the cover portion extends radially outwardly from the bearing portion, wherein the torsion damper is arranged axially between the first axial side and the cover portion. This can further reduce the axial installation space required for the torque transmission device.

In a further embodiment, the input hub has, on a side facing the output hub, a first centering shoulder having a first centering surface arranged on an outer circumferential side of the first centering shoulder. The output hub has a second centering shoulder with a second centering surface on an inner circumferential side. The first centering shoulder engages in the second centering shoulder. The first centering surface and the second centering surface are designed to align the output hub with respect to the input hub in the radial direction. This ensures a reliable alignment of the output hub with respect to the input hub.

An improved drive train for a motor vehicle can be provided by the drive train having a torque transmission device designed as described above, an internal combustion engine and an electric machine having a rotor and a stator. A crankshaft of the internal combustion engine is connected to the input hub in a torque-transmitting manner. The stator is arranged radially outwardly with respect to the rotor, wherein the rotor is arranged and fastened on the fastening portion radially on the outside of the fastening portion. The torsion damper is connected in a torque-transmitting manner to the input hub and is designed to at least partially cancel out a rotational irregularity originating from the internal combustion engine between the input hub and the output hub. As a result, the electric machine can be fastened radially on the outside with respect to the torsion damper with an axial overlap of the torque transmission device, so that the drive train as a whole is particularly compact in the radial direction and in the axial direction.

In a further embodiment, the rotor has an end face extending in a plane of rotation, wherein the end face and the fastening portion terminate in a flush manner. This allows the fastening portion to be designed as particularly thin in the axial direction.

BRIEF DESCRIPTION OF THE DRAWINGS

The present disclosure is explained in more detail below with reference to figures. In the figures.

DETAILED DESCRIPTION

Figure 1:
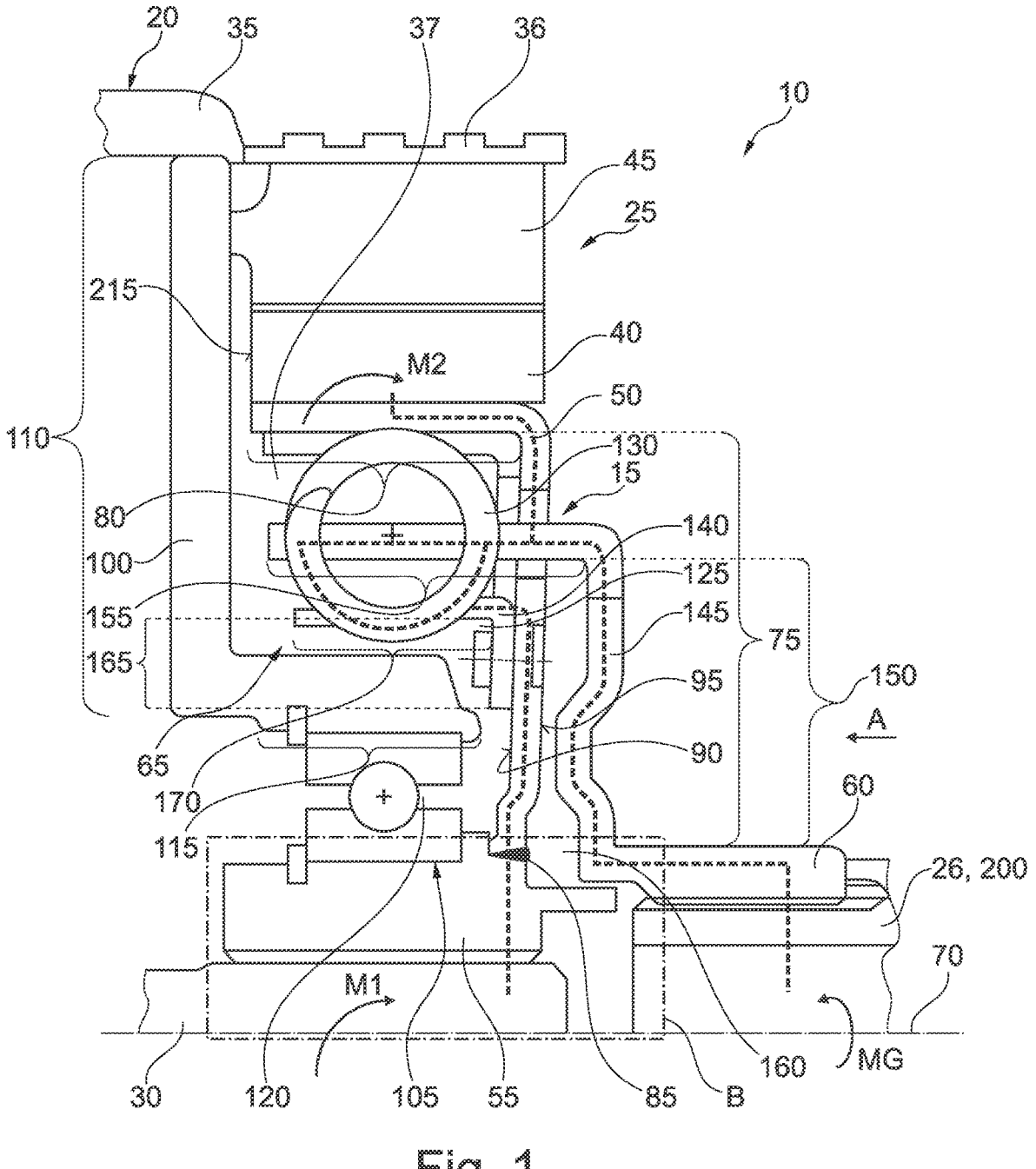
FIG. 1 shows a half-longitudinal section through a partial representation of a drive train of a motor vehicle.

FIG. 1 shows a half-longitudinal section through a section of a drive train 10 of a motor vehicle.

The drive train 10 has a torque transmission device 15, an internal combustion engine 20 shown only in a rudimentary capacity in FIG. 1, an electric machine 25 and a transmission device 26. The internal combustion engine 20 and the electric machine 25 are each designed to drive the motor vehicle, in particular to provide a traction force for driving the motor vehicle, and together form a hybrid drive for the motor vehicle. The hybrid drive can be operated in series or parallel. Also, the electric machine 25 can be operated in the manner of a generator to generate electrical energy and charge a traction battery of the drive train 10.

The internal combustion engine 20 has a crankshaft 30 and a motor housing 35. The crankshaft 30 is mounted rotatably about an axis of rotation 70 in the motor housing 35. At the crankshaft 30, the internal combustion engine 20 provides a first torque M1 superimposed with rotational irregularities when activated.

The transmission device 26 has a transmission housing 36, which is fastened to the motor housing 35 in a non-rotatable manner and adjoins the motor housing 35 at the end face. The transmission housing 36 delimits a housing interior 37, wherein the torque transmission device 15 and the electric machine 25 are arranged within the housing interior 37. The electric machine 25 is designed by way of example as an internal rotor and has a rotor 40 and a stator 45. The stator 45 is connected in a non-rotatable manner to the transmission housing 36. The stator 45 can have one or more windings in order to provide a rotating electric field to drive the rotor 40.

The torque transmission device 15 has a rotor carrier 50, an input hub 55, an output hub 60, a torsion damper 65, a bearing cover 100 and a bearing arrangement 105.

Radially on the inside, the crankshaft 30 engages in the input hub 55, wherein the crankshaft 30 and the input hub 55 are connected to one another in a torque-transmitting manner, in particular in a non-rotatable manner, for example via a shaft-hub connection. The output hub 60 is arranged axially spaced apart from the input hub 55 on a side facing away from the internal combustion engine 20. In the assembled state, the output hub 60 engages in a transmission input shaft 200 of the transmission device 26. In this regard, the output hub 60 is connected in a torque-transmitting manner to the transmission input shaft 200, for example, by means of a shaft-hub connection.

The rotor carrier 50 is mounted rotatably about the axis of rotation 70. By way of example, the rotor carrier 50 is designed to be pot-shaped and can be deep-drawn or punch-bent from a flat sheet material, for example. In the embodiment, the rotor carrier 50 has a first flange portion 75, extending in the radial direction substantially in a plane of rotation perpendicular to the axis of rotation 70, and a fastening portion 80, extending in the axial direction substantially parallel to the axis of rotation 70. The fastening portion 80 and the first flange portion 75 are formed integrally and of the same material. The fastening portion 80 is arranged and fastened radially on the outside on the first flange portion 75. The fastening portion 80 can, for example, be designed as substantially hollow-cylindrical about the axis of rotation 70. At a first outer circumferential side of the fastening portion 80, the rotor 40 of the electric machine 25 is fastened to the fastening portion 80.

In the embodiment, the first flange portion 75 is designed to be substantially disc-shaped. In this regard, a first axial side 90, which is arranged on the end face on the side facing the internal combustion engine 20, can be designed to be substantially planar and extend substantially vertically outward in the radial direction. The first flange portion 75 further has a second axial side 95, which is arranged axially opposite the first axial side 90. The output hub 60 is arranged on the side facing the second axial side 95.

Radially on the inside, the first flange portion 75 of the rotor carrier 50 is connected to the input hub 55 in a non-rotatable manner by means of a welding connection 85, for example. The input hub 55 and the fastening portion 80 extend substantially along the common first axial side 90 of the first flange portion 75. In this regard, the input hub 55 and the fastening portion 80 have an axial overlap. The term "axial overlap" is understood to mean that when two components, for example the fastening portion 80 and the input hub 55 in the radial direction, are projected into a first projection plane in which the axis of rotation 70 runs, the two components, for example the fastening portion 80 and the input hub 55, overlap in the projection plane.

The bearing cover 100 has a cover portion 110, extending in the radial direction, and a bearing portion 115 adjoining the cover portion 110 radially inwardly and extending in the axial direction parallel to the axis of rotation 70. The cover portion 110 extends in the radial direction and can be arranged in a plane of rotation perpendicular to the axis of rotation 70. Radially on the inside, the cover portion 110 is connected in a non-rotatable manner to the bearing portion 115. Radially on the outside, the cover portion 110 can be connected in a non-rotatable manner to the motor housing 35. The bearing portion 115 can, for example, be designed as extending about the axis of rotation 70 in a hollow-cylindrical manner. The bearing portion 115 and the cover portion 110 can, for example, be manufactured integrally and of the same material, for example by casting. The bearing portion 115 extends in the axial direction away from the cover portion 110 in the direction of the output hub 60 and runs axially toward the first flange portion 75. In this regard, the bearing portion 115 engages in an annular gap 125 between the fastening portion 80 and the input hub 55. Thus, the bearing portion 115 has an axial overlap with both the fastening portion 80 and the input hub 55.

The bearing portion 115 forms a bearing receptacle 120 with a first inner circumferential side and the input hub 55 forms a bearing receptacle with a second circumferential side, wherein the bearing receptacle 120 is formed so as to extend annularly about the axis of rotation 70. The bearing arrangement 105 is arranged in the bearing receptacle 120. For example, the bearing arrangement 105 can have a rolling bearing, in particular a ball bearing or a spherical bearing. It is of particular advantage if the rolling bearing is exclusively single row. The input hub 55 is mounted rotatably about the axis of rotation 70 on the bearing cover 100 via the bearing arrangement 105.

The torsion damper 65 is arranged radially between the fastening portion 80 and the bearing portion 115. Thus, the bearing portion 115 and the torsion damper 65 have an axial overlap. The engagement of the bearing portion 115 and the arrangement of the bearing portion 115 and the bearing arrangement 105 in the annular gap 125 allows the drive train 10 to be designed as particularly compact in the axial direction. This is further ensured by the torsion damper 65 being arranged axially between the first axial side 90 and the cover portion 110.

The torsion damper 65 has a first energy storage element 130, a second energy storage element 135, hidden in FIG. 1, a damper input part 140, and a damper output part 145. The first energy storage element 130 and/or the second energy storage element 135 can be designed, for example, as an arc spring or a compression spring. The first energy storage element 130 and/or the second energy storage element 135 may be aligned tangentially in the circumferential direction or as running on a circular path about the axis of rotation 70.

The damper output part 145 has a second flange portion 150 and an actuating portion 155, wherein the second flange portion 150 is designed to be disc-shaped and extend in a substantially radial direction. The actuating portion 155 is arranged on the second flange portion 150 radially on the outside. The actuating portion 155 extends substantially parallel to the axis of rotation 70. Radially on the inside, the second flange portion 150 is connected to the output hub 60. The second flange portion 150, the actuating portion 155 and the output hub 60 may be formed integrally and of the same material. The second flange portion 150 is arranged on the side facing the second axial side 95. In the axial direction, the second flange portion 150 is arranged between the first flange portion 75 and the output hub 60. In this regard, the second flange portion 150 and the first flange portion 75 are arranged adjacent to one another through an axial gap 160.

The damper input part 140 has a third flange portion 165, extending in the radial direction, and a coupling portion 170, extending in the axial direction along the axis of rotation 70) and connected to the third flange portion 165. The coupling portion 170 extends parallel to the axis of rotation 70. The coupling portion 170 is connected to the third flange portion 165. The coupling portion 170 and the third flange portion

165 may be formed integrally and of the same material. In this regard, the damper input part 140 has a substantially L-shaped design.

The third flange portion 165, which is radially outwardly connected to the coupling portion 170, rests against the first axial side 90 and is connected to the first flange portion 75 by means of a riveted joint. The coupling portion 170 has an axial overlap with the fastening portion 80 and extends in the direction of the cover portion 110.

The actuating portion 155 is arranged radially between the fastening portion 80 and the coupling portion 170. Both the actuating portion 155 and the coupling portion 170 are each coupled and operatively connected to the energy storage element 130, 135.

Radially on the outside of the fastening portion 80, the rotor 40 of the electric machine 25 is attached in a non-rotatable manner to the fastening portion 80. Radially on the inside, the energy storage element 130, 135 can rest against the fastening portion 80 and/or the fastening portion 80 supports the energy storage element 130, 135 radially outwardly so that a position of the energy storage element 130, 135 is secured under the effect of centrifugal force.

The rotor 40 has an end face 215 on a side facing the bearing cover 100 and the internal combustion engine 20. The end face 215 extends substantially in a plane of rotation. The fastening portion 80 and the end face 215 terminate in a flush manner, so that an axial distance between the cover portion 110 and the rotor 40 is particularly small. This means that the axial installation space required for the torque transmission device is particularly small.

Figure 2:
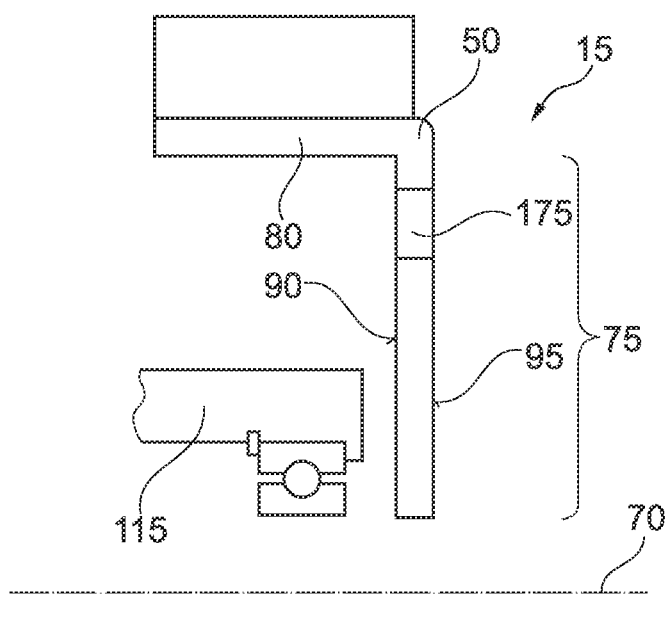
FIG. 2 shows a section of a torque transmission device shown in FIG. 1.

FIG. 2 shows a section of the torque transmission device 15 shown in FIG. 1, wherein the torsion damper 65 is not shown for reasons of clarity.

The rotor carrier 50 has at least one through-opening 175. The through-opening 175 is arranged in the first flange portion 75 and extends completely through the first flange portion 75 between the first axial side 90 and the second axial side 95. The through-opening 175 extends substantially parallel to the axis of rotation 70 through the first flange portion 75. Here, the through-opening 175 is arranged between the bearing portion 115 and the fastening portion 80 in the radial direction. The through-opening 175 at least partially has a radial overlap with the energy storage element 130, 135.

In this context, the term "radial overlap" is understood to mean that when two components are projected in the axial direction into a second projection plane, which runs perpendicular to the axis of rotation 70, the two components, for example in FIG. 2 the torsion damper 65, in particular the energy storage element 130, 135, and the through-opening 175 overlap in the second projection plane.

Figure 3:
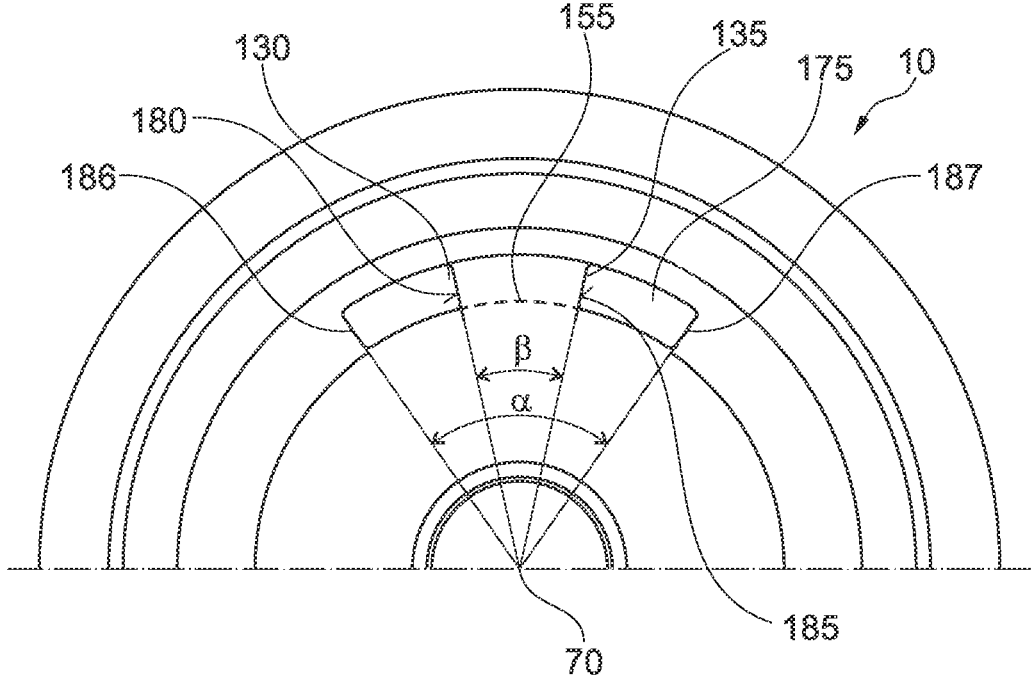
FIG. 3 shows a side view with a view direction A marked in FIG. 1 on the drive train shown in FIG. 1.

FIG. 3 shows a side view with a view direction A marked in FIG. 1 on the drive train 10 shown in FIG. 1.

The first energy storage element 130 and the second energy storage element 135 are arranged spaced apart from one another in the circumferential direction. The actuating portion 155 of the damper output part 145 engages between the first energy storage element 130 and the second energy storage element 135. The actuating portion 155 has a first side surface 180. The first side surface 180 rests against a first end of the first energy storage element 130. In the circumferential direction opposite the first side surface 180, the actuating portion 155 has a second side surface 185, wherein the second side surface 185 rests against a second end of the second energy storage element 135. As a result of the first energy storage element 130 resting against the first side surface 180 and the second energy storage element 135 resting against the second side surface 185, the energy storage elements 130, 135 are each operatively connected to the actuating portion 155.

The through-opening 175 extends in the circumferential direction on a circular path about the axis of rotation 70 and is thus formed at least partially annular. The through-opening 175 is passed through by the actuating portion 155, wherein the actuating portion 155 protrudes from the second axial side 95 into the annular gap 125 via the first axial side 90 (cf. FIG. 1). The through-opening 175 forms a first angular segment a in the circumferential direction. The actuating portion 155 is designed to be narrower in the circumferential direction than the through-opening 175. In this context, the actuating portion 155 forms a second angular segment ß that is significantly smaller than the first angular segment a. The significantly larger first angular segment a of the through-opening 175 allows the actuating portion 155 to be moved in the circumferential direction in the through-opening 175.

The first angular segment a and the second angular segment ß can be matched to one another such that the respectively facing side surface 180, 185 abuts an associated end 186, 187 of the through-opening 175 in the circumferential direction before the energy storage element 130, 135 is fully compressed, for example, moved to block. This can prevent mechanical damage to the energy storage element 130, 135 and the damper output part 145.

Figure 4:
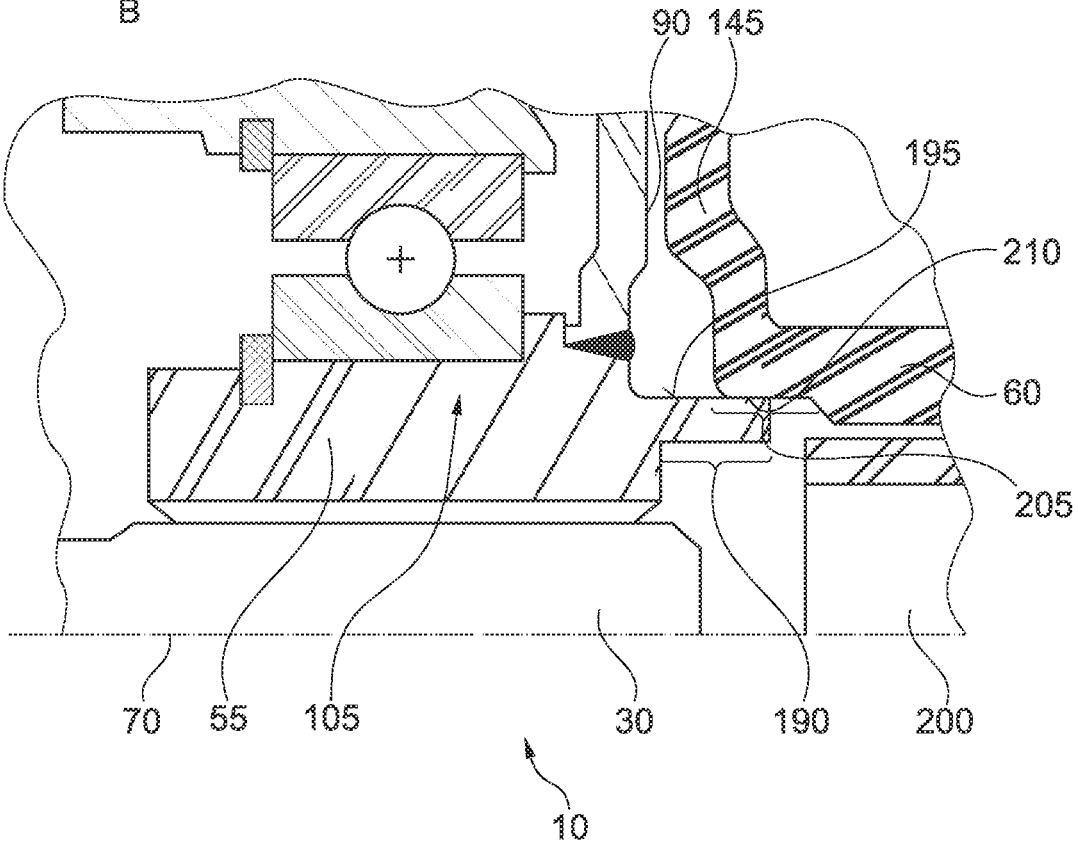
FIG. 4 shows a section B marked in FIG. 1 of the drive train shown in FIG. 1.

FIG. 4 shows a section B marked in FIG. 1 of the drive train 10 shown in FIG. 1.

On a side facing away from the internal combustion engine 20, the input hub 55 has a first centering shoulder 190. The first centering shoulder 190 has a first centering surface 195 on a third outer circumferential side. The first centering surface 195 runs on a circular path about the axis of rotation 70).

The output hub 60 has a second centering shoulder 205 with a second centering surface 210 on an inner circumferential side. The second centering shoulder 250 is arranged on a side of the output hub 60 facing the second axial side 90. The second centering surface 210 runs on a circular path about the axis of rotation 70. In the assembled state of the drive train 10, the first centering shoulder 190 and the second centering shoulder 205 are arranged in a partially radially overlapping manner such that the first centering shoulder 190 engages in the second centering shoulder 205. The first centering surface 195 rests against the second centering surface 210. Due to the fact that the input hub 55 is fixed radially on the outside in its radial position by the bearing arrangement 105 in a defined manner, a radial position of the damper output part 145 and the output hub 60 can be fixed in a defined manner in the radial direction by the abutment of the first and second centering surfaces 195, 210 in order to ensure ease of assembly and ease of insertion for the transmission input shaft 200 into the output hub 60.

In the following, FIGS. 1 to 4 are explained together in order to describe the operation of the drive train 10. As already mentioned, the internal combustion engine 20 provides the first torque M1 when activated. A torque flow of the first torque M1 is shown in FIG. 1 by means of a dashed line.

The first torque M1 is transmitted from the crankshaft 30 to the first flange portion 75 via the input hub 55. From the first flange portion 75, the first torque M1 is transmitted to the third flange portion 165. From the third flange portion 165, the torque M1 is transmitted to the coupling portion 170 of the damper input part 140. The coupling portion 170 actuates the energy storage element 130, 135.

Due to a counter-torque MG acting on the transmission input shaft 200, which is directed in the opposite direction to the first torque M1, the first torque M1 braces the first energy storage element 130. The first torque M1 is transmitted to the actuating portion 155 via the first energy storage element 130. In this regard, in the circumferential direction with respect to a rest position of the first flange portion 78 shown in FIG. 3, the first flange portion 78 is moved in the circumferential direction with respect to the actuating portion 155. The embodiment of the through-opening 175 shown in FIG. 3 thus ensures that the first flange portion 75 can move relative to the actuating portion 155.

The first torque M1 is transmitted to the output hub 60 via the actuating portion 155 and the second flange portion 150.

If the electric machine 25 is used to drive the motor vehicle in addition to or as an alternative to the internal combustion engine 20, the electric machine 25 provides the second torque M2. The second torque M2 is introduced into the rotor carrier 50 via the fastening portion 80. The second torque M2 is transmitted further to the first flange portion 75. From the first flange portion 75, the torque transmission is substantially analogous to the torque transmission of the first torque M1 via the torsion damper 65 to the output hub 60, wherein, however, differing from the transmission of the first torque M1, the second torque M2 provided by the electric machine 25 is substantially free of rotational irregularities, so that although the energy storage element 130, 135 is compressed during the transmission of the second torque M2, the torsion damper 65 serves exclusively for the torque transmission of the second torque M2, but in doing so has substantially no rotational irregularities to cancel out.

The embodiment described in FIGS. 1 to 4 makes the drive train 10 particularly compact in the axial direction. Furthermore, the design of the rotor carrier 50 is particularly simple and thus particularly cost-effective. Furthermore, limiting the movement of the actuating portion 155 in the through-opening 175 reliably prevents overloading of the energy storage element 130, 135, thus ensuring a long service life of the torsion damper 65. Furthermore, the embodiment shown in FIGS. 1 to 4 can provide a high level of noise and vibration comfort for the drive train 10 by means of the torsion damper 65 integrated into the installation space, wherein the torsion damper 65 can have a high damping capacity.

LIST OF REFERENCE SIGNS

10 Drive train
15 Torque transmission device
20 Internal combustion engine
25 Electric machine
26 Transmission device
30 Crankshaft
35 Motor housing
36 Transmission housing
37 Housing interior
40 Rotor
45 Stator
50 Rotor carrier
55 Input hub
60 Output hub
65 Torsion damper
70 Axis of rotation
75 First flange portion
80 Fastening portion
85 Welding connection 90 First axial side
95 Second axial side
100 Bearing cover
105 Bearing arrangement
110 Cover portion
115 Bearing portion
120 Bearing receptacle
125 Annular gap
130 First energy storage element
135 Second energy storage element
140 Damper input part
145 Damper output part
150 Second flange portion
155 Actuating portion
160 Axial gap
165 Third flange portion
170 Coupling portion
175 Through-opening
180 First side surface
185 Second side surface
186 End of the through-opening
187 End of the through-opening
190 First centering shoulder
195 First centering surface
200 Transmission input shaft
205 Second centering shoulder
210 Second centering surface
215 End face
M1 First torque
M2 Second torque
MG Counter-torque
α First angular segment
β Second angular segment

The invention claimed is:

1. A torque transmission device for a drive train of a motor vehicle, comprising:
a rotor carrier mounted rotatably about an axis of rotation;
an input hub;
an output hub; and
a torsion damper;
wherein the rotor carrier includes a fastening portion extending in an axial direction radially outwardly with respect to the input hub and a first flange portion extending in a radial direction;
wherein the fastening portion and the input hub are arranged on a first axial side of the first flange portion and are connected to the first flange portion;
wherein the torsion damper has an energy storage element and a damper output part, which has a second flange portion extending in the radial direction and an actuating portion extending in the axial direction and being operatively connected to the energy storage element;
wherein, radially on the inside, the second flange portion is connected in a torque-transmitting manner to the output hub and, radially on the outside, to the actuating portion;
wherein the second flange portion is axially arranged between a second axial side of the first flange portion, facing away from the first axial side, and the output hub;
wherein the first flange portion has a through-opening which extends in the axial direction and through which the actuating portion passes.

2. The torque transmission device 4, according to claim 1, wherein the torsion damper has a damper input part having a third flange portion, extending in the radial direction and a coupling portion extending in the axial direction along the axis of rotation and being connected to the third flange portion;
wherein the third flange portion is arranged on the first axial side and is connected to the first flange portion;
wherein the coupling portion extends away from the first axial side and is operatively connected to the energy storage element;
wherein the coupling portion is arranged radially on the inside with respect to the actuating portion;
wherein the first flange portion of the rotor carrier is rotatable relative to the actuating portion against action of the energy storage element by a torque introduced into the torque transmission device via the input hub.

3. The torque transmission device according to claim 2,
wherein the torsion damper includes a further energy storage element;
wherein the energy storage element is arranged spaced apart from the further energy storage element in a circumferential direction;
wherein the actuating portion is arranged in the circumferential direction between the energy storage element and the further energy storage element and is operatively connected to the energy storage element and the further energy storage elements.

4. The torque transmission device according to claim 2, wherein the actuating portion is arranged radially between the fastening portion and the coupling portion.

5. The torque transmission device according to claim 1,
wherein the through-opening is formed partially annular and extends in a circumferential direction with respect to the axis of rotation over a first angular segment (α),
wherein the actuating portion extends in the circumferential direction with respect to the axis of rotation over a second angular segment (β),
wherein the second angular segment (β) is smaller than the first angular segment (α).

6. The torque transmission device according to claim 1, wherein the first flange portion is arranged in a substantially disc-shaped manner extending in a plane of rotation with respect to the axis of rotation.

7. The torque transmission device according to claim 1, further comprising
a bearing cover and a bearing arrangement;
wherein the bearing cover has a bearing portion extending in the axial direction;
wherein, radially between the input hub and the bearing portion, the bearing arrangement is arranged for supporting the input hub on the bearing portion;
wherein the bearing portion extends in the axial direction away from the first axial side and has an axial overlap with at least one of the torsion damper and the fastening portion.

8. The torque transmission device according to claim 7,
wherein the bearing cover has a cover portion extending in the radial direction, which is radially outwardly adjacent to the bearing portion;
wherein the cover portion extends radially outwardly from the bearing portion;
wherein the torsion damper is arranged axially between the first axial side and the cover portion.

9. The torque transmission device according to claim 1,
wherein the input hub has, on a side facing the output hub, a first centering shoulder having a first centering surface arranged on an outer circumferential side of the first centering shoulder;

wherein the output hub has a second centering shoulder with a second centering surface on an inner circumferential side thereof;

wherein the first centering shoulder engages the second centering shoulder;

wherein the first centering surface and the second centering surface are designed to align the output hub with respect to the input hub in the radial direction.

10. A drive train for a motor vehicle, comprising a torque transmission device, an internal combustion engine, and an electric machine having a rotor and a stator, wherein the torque transmission device includes:

a rotor carrier mounted rotatably about an axis of rotation, an input hub, an output hub, a torsion damper;

wherein the rotor carrier includes a fastening portion extending in an axial direction radially outwardly with respect to the input hub and a first flange portion extending in a radial direction;

wherein the fastening portion and the input hub are arranged on a first axial side of the first flange portion and are connected to the first flange portion;

wherein the torsion damper has an energy storage element and a damper output part, which has a second flange portion extending in the radial direction and an actuating portion extending in the axial direction and being operatively connected to the energy storage element;

wherein, radially on the inside, the second flange portion is connected in a torque-transmitting manner to the output hub and, radially on the outside, to the actuating portion;

wherein the second flange portion is axially arranged between a second axial side of the first flange portion, facing away from the first axial side and the output hub;

wherein the first flange portion has a through-opening which extends in the axial direction and through which the actuating portion passes;

wherein a crankshaft of the internal combustion engine is connected in a torque-transmitting manner to the input hub;

wherein the stator is arranged radially outwardly with respect to the rotor;

wherein the rotor is arranged and fastened on the fastening portion; radially on the outside of the fastening portion;

wherein the torsion damper is connected in a torque-transmitting manner to the input hub and is configured to at least partially cancel out a rotational irregularity originating from the internal combustion engine between the input hub and the output hub.

11. The drive train according to claim 10, wherein the rotor has an end face extending in a plane of rotation and facing the internal combustion engine;

wherein the end face and the fastening portion terminate in a flush manner.

12. The drive train according to claim 10, wherein the torsion damper has a damper input part having a third flange portion extending in the radial direction and a coupling portion extending in the axial direction along the axis of rotation and being connected to the third flange portion;

wherein the third flange portion is arranged on the first axial side and is connected to the first flange portion;

wherein the coupling portion extends away from the first axial side and is operatively connected to the energy storage element;

wherein the coupling portion is arranged radially on the inside with respect to the actuating portion;

wherein the first flange portion of the rotor carrier is rotatable relative to the actuating portion against action of the energy storage element by a torque introduced into the torque transmission device via the input hub.

13. The drive train according to claim 12, wherein the torsion damper includes a further energy storage element;

wherein the energy storage element is arranged spaced apart from the further energy storage element in a circumferential direction;

wherein the actuating portion is arranged in the circumferential direction between the energy storage element and the further energy storage element and is operatively connected to the energy storage element and the further energy storage element.

14. The drive train according to claim 12, wherein the actuating portion is arranged radially between the fastening portion and the coupling portion.

15. The drive train according to claim 10, wherein the through-opening is formed partially annular and extends in a circumferential direction with respect to the axis of rotation over a first angular segment ($\alpha$), wherein the actuating portion extends in the circumferential direction with respect to the axis of rotation over a second angular segment ($\beta$), wherein the second angular segment ($\beta$) is smaller than the first angular segment ($\alpha$).

16. The drive train according to claim 10, wherein the first flange portion is arranged in a substantially disc-shaped manner extending in a plane of rotation with respect to the axis of rotation.

17. The drive train according to claim 10, further comprising a bearing cover and a bearing arrangement;

wherein the bearing cover has a bearing portion extending in the axial direction;

wherein, radially between the input hub and the bearing portion, the bearing arrangement is arranged for supporting the input hub on the bearing portion;

wherein the bearing portion extends in the axial direction away from the first axial side and has an axial overlap with at least one of the torsion damper and the fastening portion.

18. The drive train according to claim 17, wherein the bearing cover has a cover portion extending in the radial direction, which is radially outwardly adjacent to the bearing portion;

wherein the cover portion extends radially outwardly from the bearing portion;

wherein the torsion damper is arranged axially between the first axial side and the cover portion.

19. The drive train according to claim 18, wherein the internal combustion engine includes a motor housing defining the axis of rotation;

wherein, radially on the outside, the bearing cover is non-rotatably connected to the motor housing.

20. The drive train according to claim 10, wherein the input hub has, on a side facing the output hub, a first centering shoulder having a first centering surface arranged on an outer circumferential side of the first centering shoulder;

wherein the output hub has a second centering shoulder with a second centering surface on an inner circumferential side thereof;

wherein the first centering shoulder engages the second centering shoulder;

wherein the first centering surface and the second centering surface are designed to align the output hub with respect to the input hub in the radial direction.

* * * * *